United States Patent
Shock

(10) Patent No.: US 10,830,031 B2
(45) Date of Patent: Nov. 10, 2020

(54) MOBILE DISTRIBUTION STATION HAVING SATELLITE DISH

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC., Birmingham, MI (US)

( * ) Notice: Subject to any disclaimer, the term of this patent is extended or adjusted under 35 U.S.C. 154(b) by 0 days.

(21) Appl. No.: 16/546,456

(22) Filed: Aug. 21, 2019

(65) Prior Publication Data
US 2020/0063544 A1   Feb. 27, 2020

Related U.S. Application Data

(60) Provisional application No. 62/722,318, filed on Aug. 24, 2018.

(51) Int. Cl.
*B60P 3/00* (2006.01)
*E21B 43/26* (2006.01)
(Continued)

(52) U.S. Cl.
CPC .............. *E21B 43/26* (2013.01); *B60P 3/035* (2013.01); *B62D 63/08* (2013.01); *B67D 7/04* (2013.01);
(Continued)

(58) Field of Classification Search
CPC . B60P 3/00; B60P 3/035; B62D 63/00; B62D 63/08; B67D 7/04; B67D 7/08;
(Continued)

(56) References Cited

U.S. PATENT DOCUMENTS

| 2,340,070 A | 1/1944 | McCauley et al. |
| 2,516,150 A | 7/1950 | Samiran |

(Continued)

FOREIGN PATENT DOCUMENTS

| DE | 1147397 | 4/1963 |
| DE | 20106400 | 10/2001 |

(Continued)

OTHER PUBLICATIONS

Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.

(Continued)

*Primary Examiner* — Timothy L Maust
(74) *Attorney, Agent, or Firm* — Carlson, Gaskey & Olds, P.C.

(57) ABSTRACT

A distribution station includes a mobile trailer, a pump on the mobile trailer, at least one manifold on the mobile trailer and fluidly connected with the pump, and a plurality of reels on the mobile trailer. A plurality of hoses are connected with different ones of the reels. A plurality of valves on the mobile trailer are situated between the manifold and respective different ones of the reels. A plurality of fluid level sensors are associated with different ones of the hoses. A controller is configured to individually open and close the valves responsive to the fluid level sensors, and a satellite dish is mounted on the mobile trailer. The satellite dish is moveable between a stowed position and a deployed position.

4 Claims, 5 Drawing Sheets

(51) Int. Cl.
*B60P 3/035* (2006.01)
*B62D 63/08* (2006.01)
*B67D 7/04* (2010.01)
*B67D 7/84* (2010.01)
*B67D 7/32* (2010.01)
*B67D 7/40* (2010.01)
*B67D 7/74* (2010.01)
*B67D 7/78* (2010.01)
*B67D 7/08* (2010.01)

(52) U.S. Cl.
CPC .............. *B67D 7/08* (2013.01); *B67D 7/3272* (2013.01); *B67D 7/40* (2013.01); *B67D 7/74* (2013.01); *B67D 7/78* (2013.01); *B67D 7/845* (2013.01)

(58) Field of Classification Search
CPC .......... B67D 7/3272; B67D 7/40; B67D 7/74; B67D 7/78; B67D 7/845; H01Q 1/288
USPC ................... 141/231; 343/713, 881
See application file for complete search history.

(56) References Cited

U.S. PATENT DOCUMENTS

| | | | |
|---|---|---|---|
| 2,769,572 A | 11/1956 | Harman et al. | |
| 2,777,461 A | 1/1957 | Wildhaber | |
| 2,966,921 A | 1/1961 | Whiteman | |
| 3,028,010 A | 4/1962 | Headrick | |
| 3,136,295 A | 6/1964 | Gramo | |
| 3,412,404 A * | 11/1968 | Bergling | H01Q 1/084 343/762 |
| 3,547,141 A | 12/1970 | Alexander | |
| 3,605,798 A | 9/1971 | Green et al. | |
| 3,618,643 A | 11/1971 | Thomson | |
| 3,625,399 A | 12/1971 | Heisler | |
| 3,656,134 A | 4/1972 | Brown | |
| 3,677,284 A | 7/1972 | Mendez | |
| 3,881,509 A | 5/1975 | Newton | |
| 4,139,019 A | 2/1979 | Bresie et al. | |
| 4,284,210 A | 8/1981 | Horak | |
| 4,309,708 A * | 1/1982 | Sayovitz | H01Q 15/162 343/713 |
| 4,511,311 A | 4/1985 | Olson | |
| 4,591,115 A | 5/1986 | DeCarlo | |
| 4,651,788 A | 3/1987 | Grosskreuz et al. | |
| 4,710,778 A * | 12/1987 | Radov | H01O 1/42 343/720 |
| 4,728,005 A | 3/1988 | Jacobs et al. | |
| 4,811,026 A * | 3/1989 | Bissett | H01Q 1/125 343/714 |
| 4,930,665 A | 6/1990 | Devine | |
| 5,337,062 A * | 8/1994 | Sherwood | H01Q 1/3275 343/711 |
| 5,406,988 A | 4/1995 | Hopkins | |
| 5,414,435 A * | 5/1995 | Wolf | H01Q 1/1235 280/762 |
| 5,454,408 A | 10/1995 | DiBella et al. | |
| 5,465,766 A | 11/1995 | Siegele et al. | |
| 5,503,199 A | 4/1996 | Whitley, II et al. | |
| 5,538,051 A | 7/1996 | Brown et al. | |
| 5,551,309 A | 9/1996 | Goossens et al. | |
| 5,651,400 A | 7/1997 | Corts et al. | |
| 5,660,358 A | 8/1997 | Grafwallner et al. | |
| 5,708,424 A | 1/1998 | Orlando et al. | |
| 5,749,339 A | 5/1998 | Graham et al. | |
| 5,887,567 A | 3/1999 | White et al. | |
| 5,927,603 A | 7/1999 | McNabb | |
| 5,884,675 A | 12/1999 | Krasnov | |
| 6,098,646 A | 8/2000 | Hennemann et al. | |
| 6,206,056 B1 | 3/2001 | Lagache | |
| 6,421,019 B1 * | 7/2002 | Albertelli | H01Q 1/3216 343/713 |
| 6,564,615 B1 | 5/2003 | Carter | |
| 6,573,871 B2 * | 6/2003 | Drews | E04H 5/02 343/713 |
| 6,601,000 B1 | 7/2003 | Barlian et al. | |
| 6,651,706 B2 | 11/2003 | Litt | |
| 6,697,705 B2 | 2/2004 | Johnson et al. | |
| 6,745,801 B1 | 6/2004 | Cohen et al. | |
| 6,755,225 B1 | 6/2004 | Niedwiecki et al. | |
| 6,761,194 B1 | 7/2004 | Blong | |
| 6,779,569 B1 | 8/2004 | Teer, Jr. et al. | |
| 6,786,245 B1 | 9/2004 | Eichelberger et al. | |
| 6,864,846 B2 * | 3/2005 | King | H01Q 1/125 343/713 |
| 6,867,729 B2 | 3/2005 | Berry et al. | |
| 7,063,276 B2 | 6/2006 | Newton | |
| 7,106,026 B2 | 9/2006 | Moore | |
| 7,353,808 B2 | 4/2008 | Kakoo | |
| 7,397,435 B2 * | 7/2008 | McEwan | H01Q 1/084 343/713 |
| 7,401,511 B2 | 7/2008 | Dietmeier | |
| 7,415,995 B2 | 8/2008 | Plummer et al. | |
| 7,458,543 B2 | 12/2008 | Cutler et al. | |
| 7,568,507 B2 | 8/2009 | Farese et al. | |
| 7,610,806 B2 | 11/2009 | Skinner | |
| 7,602,143 B2 | 12/2009 | Capizzo | |
| 7,628,182 B2 | 12/2009 | Poulter | |
| 7,791,553 B2 * | 9/2010 | Conrad | H01Q 1/1214 343/711 |
| 7,937,215 B2 | 5/2011 | Humphrey | |
| 7,938,151 B2 * | 5/2011 | Hockner | B60P 3/228 141/95 |
| 8,055,526 B2 | 11/2011 | Blagg | |
| 8,069,885 B2 | 12/2011 | Kederer et al. | |
| 8,368,611 B2 * | 2/2013 | King | H01Q 1/125 343/725 |
| 8,448,750 B2 | 5/2013 | Gaugush et al. | |
| 8,959,998 B2 | 2/2015 | Birtcher et al. | |
| 9,346,662 B2 * | 5/2016 | Van Vliet | B67D 7/04 |
| 9,371,830 B2 | 6/2016 | Moffitt, Jr. | |
| 9,371,831 B2 | 6/2016 | Moffitt, Jr. | |
| 9,434,598 B2 | 9/2016 | Pick et al. | |
| 9,586,805 B1 * | 3/2017 | Shock | B67D 7/40 |
| 9,725,295 B2 | 8/2017 | McKay et al. | |
| 9,790,080 B1 * | 10/2017 | Shock | B67D 7/3218 |
| 9,815,683 B1 * | 11/2017 | Kalala | B67D 7/362 |
| 9,981,840 B2 * | 5/2018 | Shock | B67D 7/465 |
| 10,150,662 B1 * | 12/2018 | Shock | B67D 7/74 |
| 10,289,126 B2 * | 5/2019 | Shock | G05D 9/12 |
| 2001/0017815 A1 | 8/2001 | Ackermann et al. | |
| 2004/0163731 A1 | 8/2004 | Eichelberger et al. | |
| 2004/0187950 A1 | 9/2004 | Cohen et al. | |
| 2005/0109561 A1 | 5/2005 | Chopra | |
| 2006/0082263 A1 * | 4/2006 | Rimler | B60P 3/14 312/201 |
| 2007/0079891 A1 | 4/2007 | Farese et al. | |
| 2007/0102946 A1 * | 5/2007 | Blackwell | A61G 3/001 296/24.38 |
| 2007/0164031 A1 | 7/2007 | Holz | |
| 2007/0181212 A1 | 8/2007 | Fell | |
| 2008/0078244 A1 | 4/2008 | Dietmeier | |
| 2009/0314384 A1 | 12/2009 | Braketield et al. | |
| 2010/0018605 A1 | 1/2010 | Bentivoglio | |
| 2011/0197988 A1 | 8/2011 | Van Vliet et al. | |
| 2015/0053371 A1 * | 2/2015 | Fisher | B60H 1/00414 165/41 |
| 2016/0076533 A1 | 3/2016 | Moffitt, Jr. | |

FOREIGN PATENT DOCUMENTS

| | | | |
|---|---|---|---|
| DE | 10130249 A1 * | 1/2003 | B60J 5/101 |
| DE | 10309307 | 9/2004 | |
| DE | 102006025025 | 12/2006 | |
| DE | 102006038652 | 2/2008 | |
| EP | 0161042 | 11/1985 | |
| EP | 0433041 | 6/2001 | |
| GB | 2485832 | 5/2012 | |
| JP | 1992062289 | 2/1992 | |
| JP | 2003002400 | 1/2003 | |
| JP | 2007182242 | 7/2007 | |

(56) References Cited

FOREIGN PATENT DOCUMENTS

| | | |
|---|---|---|
| JP | 2008265843 | 11/2008 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Safety. Retrieved Aug. 23, 2016 from: http://www.fracshack.com.
Frac Shack International. Service. Retrieved Aug. 23, 2016 from: http://www.fracshack.com.
Frac Shack International. Frac Shack Series-—Series A. Retrieved Aug. 23, 2016 from: http://www.fracshack.com.
Frac Shack International. Frac Shack Series—Series B. Retrieved Aug. 23, 2016 from: http://www.fracshack.com.
Frac Shack International. Frac Shack Series—Series C. Retrieved Aug. 23, 2016 from: http://www.fracshack.com.
Frac Shack International. Frac Shack Series—Series D. Retrieved Aug. 23, 2016 from: http://www.fracshack.com.
Frac Shack International. Frac Shack Series—Series E. Retrieved Aug. 23, 2016 from: http://www.fracshack.com.
Frac Shack International. Frac Shack Series—Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.
U.S. Appl. No. 15/655,115, filed Jul. 20, 2017.
U.S. Appl. No. 15/782,335, filed Oct. 12, 2017.
U.S. Appl. No. 15/673,730, filed Aug. 10, 2017.
U.S. Appl. No. 15/673,796, filed Aug. 10, 2017.
U.S. Appl. No. 15/416,198, filed Jan. 26, 2017.
U.S. Appl. No. 15/703,285, filed Sep. 13, 2017.
Shimazaki, H. (1986). Development of centralized fueling and management system of kerosene heating machine. Nisseki Technical Review, vol. 28(4). Jul. 1986. pp. 184-188.
Technical Document. Surface vehicle standard. SAE International. Sep. 2014. pp. 1-5.

\* cited by examiner

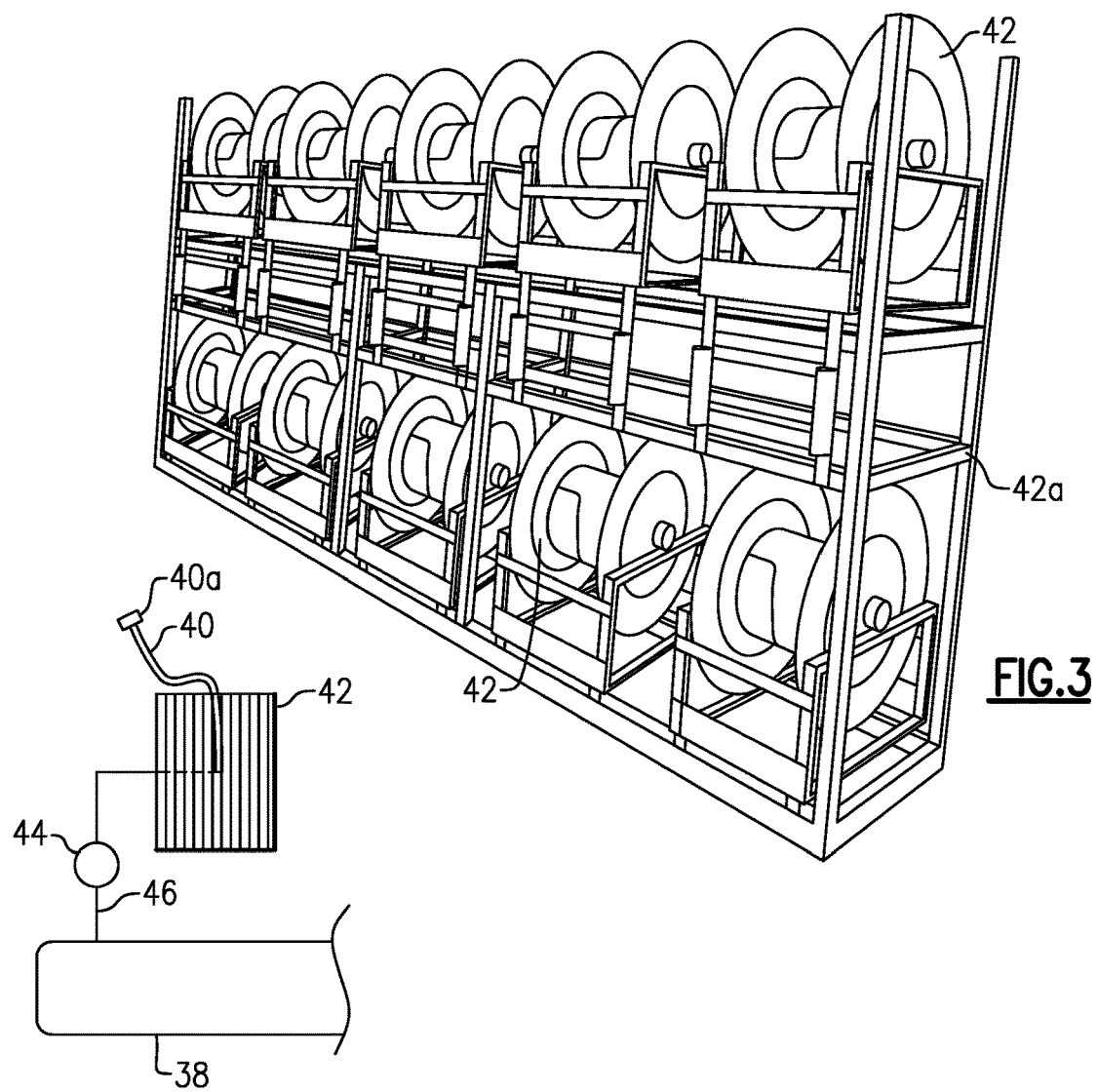
FIG.3
FIG.4
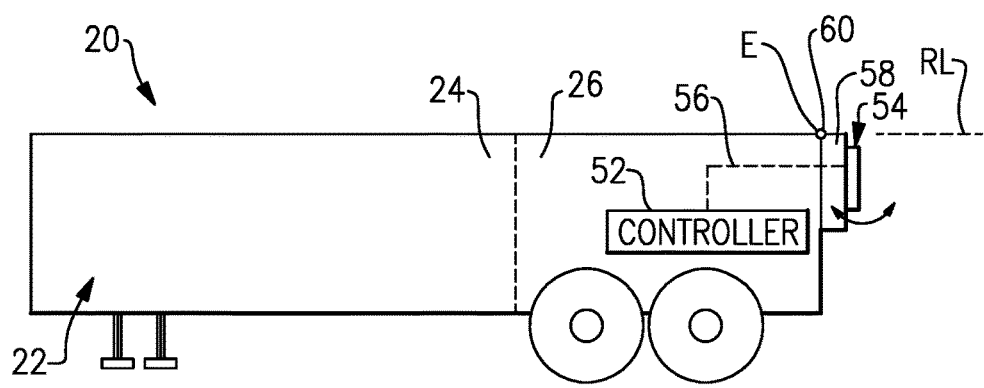
FIG.5

MOBILE DISTRIBUTION STATION HAVING SATELLITE DISH

CROSS-REFERENCE TO RELATED APPLICATIONS

This application claims priority to U.S. Provisional Application No. 62/722,318 filed Aug. 24, 2018.

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed continuously. However, hot-refueling can be difficult to reliably sustain for the duration of the fracking operation.

SUMMARY

A distribution station according to an example of the present disclosure includes a mobile trailer, a pump on the mobile trailer, at least one manifold on the mobile trailer and fluidly connected with the pump, and a plurality of reels on the mobile trailer. A plurality of hoses are connected with different ones of the reels. A plurality of valves on the mobile trailer are situated between the manifold and respective different ones of the reels. A plurality of fluid level sensors are associated with different ones of the hoses. A controller is configured to individually open and close the valves responsive to the fluid level sensors, and a satellite dish is mounted on the mobile trailer. The satellite dish is moveable between a stowed position and a deployed position.

In a further embodiment of any of the foregoing embodiments, the mobile trailer defines a top roofline, and in the stowed position the satellite dish is below the top roofline and in the deployed position the satellite dish is above the top roofline.

In a further embodiment of any of the foregoing embodiments, the satellite dish is mounted on a platform attached by a hinge to the mobile trailer. The platform is moveable via the hinge to move the satellite dish between the stowed position and the deployed position.

A further embodiment of any of the foregoing embodiments includes an electric actuator operable to move the platform.

In a further embodiment of any of the foregoing embodiments, the platform is mounted on an edge of the mobile trailer such that the platform projects from the mobile trailer as an overhang.

In a further embodiment of any of the foregoing embodiments, the mobile trailer includes a compartment recessed below the top roofline, and the satellite dish is mounted in the compartment.

In a further embodiment of any of the foregoing embodiments, the compartment includes a water drain.

In a further embodiment of any of the foregoing embodiments, the compartment is an open-top compartment.

In a further embodiment of any of the foregoing embodiments, the mobile trailer includes an isolated control room, and the compartment is over the isolated control room.

In a further embodiment of any of the foregoing embodiments, the mobile trailer includes a multi-tier roofline that has a first, top roofline section and a second, lower roofline section, and the satellite dish is mounted on the second roofline section.

In a further embodiment of any of the foregoing embodiments, in the stowed position the satellite dish is below the first roofline section and in the deployed position the satellite dish is above the first roofline section.

In a further embodiment of any of the foregoing embodiments, the satellite is non-enclosed on the second roofline section.

In a further embodiment of any of the foregoing embodiments, the satellite dish is connected for communication with the controller and operable to send and receive operating parameter signals.

A distribution station according to an example of the present disclosure includes a mobile trailer, a pump on the mobile trailer, at least one manifold on the mobile trailer and fluidly connected with the pump, and a plurality of reels on the mobile trailer. A plurality of hoses are connected with different ones of the reels. A plurality of valves on the mobile trailer are situated between the manifold and respective different ones of the reels. A plurality of fluid level sensors are associated with different ones of the hoses. A controller is configured to individually open and close the valves responsive to the fluid level sensors. The mobile trailer is capable of being moved in transit between work sites and then immobilized and activated at the work sites to deliver fluid via the hoses. A satellite dish is mounted on the mobile trailer. The satellite dish is configured to be in a stowed position when the mobile trailer is in transit and in a deployed position when the mobile trailer is activated.

In a further embodiment of any of the foregoing embodiments, the mobile trailer defines a top roofline, and in the stowed position the satellite dish is below the top roofline and in the deployed position the satellite dish is above the top roofline.

In a further embodiment of any of the foregoing embodiments, the satellite dish is mounted on a platform attached by a hinge to the mobile trailer. The platform is moveable via the hinge to move the satellite dish between the stowed position and the deployed position, and further includes an electric actuator operable to move the platform.

In a further embodiment of any of the foregoing embodiments, the mobile trailer includes a compartment recessed below the top roofline, and the satellite dish is mounted in the compartment. The compartment has a water drain.

In a further embodiment of any of the foregoing embodiments, the mobile trailer includes an isolated control room, and the compartment is over the isolated control room.

In a further embodiment of any of the foregoing embodiments, the mobile trailer includes a multi-tier roofline that has a first, top roofline section and a second, lower roofline section, and the satellite dish is mounted on the second roofline section. In the stowed position the satellite dish is below the first roofline section and in the deployed position the satellite dish is above the first roofline section.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3 illustrates an isolated view of hose reels on a support rack used in a mobile distribution station.

FIG. 4 illustrates an example of a connection between a manifold, a control valve, and a reel.

FIG. 5 illustrates the mobile distribution station with a satellite dish.

DETAILED DESCRIPTION

Figure 1:
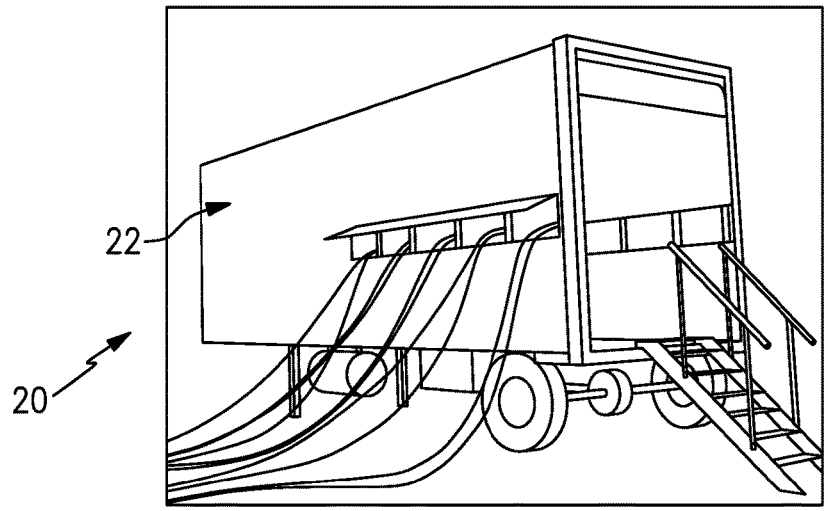
FIG. 1 illustrates an example mobile distribution station.
Figure 2:
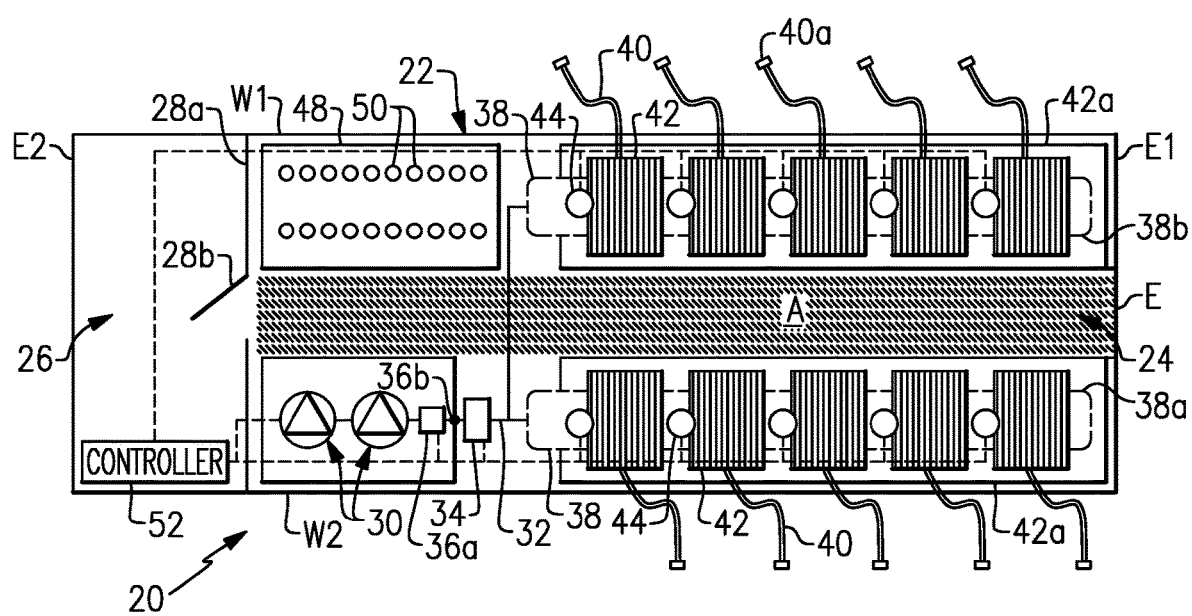
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations. In this example, the mobile trailer 22 has two sections. A first section 24 includes the physical components for distributing fuel, such as diesel fuel, and a second section 26 serves as an isolated control room for managing and monitoring fuel distribution. The section 24/26 are separated by an inside wall 28a that has an inside door 28b.

The first section 24 includes one or more pumps 30. Fuel may be provided to the one or more pumps 30 from an external fuel source, such as a tanker truck on the site. On the trailer 22, the one or more pumps 30 are fluidly connected via a fuel line 32 with one or more high precision registers 34 for metering fuel. The fuel line 32 may include, but is not limited to, hard piping. In this example, the fuel line 32 includes a filtration and air eliminator system 36a and one or more sensors 36b. Although optional, the system 36a is beneficial in many implementations, to remove foreign particles and air from the fuel prior to delivery to the equipment. The one or more sensors 36b may include a temperature sensor, a pressure sensor, or a combination thereof, which assist in fuel distribution management.

The fuel line 32 is connected with one or more manifolds 38. In the illustrated example, the station 20 includes two manifolds 38, represented at 38a and 38b, that arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40.

As shown in an isolated view in FIG. 3, the reels 42 are mounted on a support rack 42a. In this example, the support rack 42a is configured with upper and lower rows of reels 42. Each row has five reels 42 such that each support rack 42a provides ten reels 42 and thus ten hoses 40. There are two support racks 42a (FIG. 2) arranged on opposed sides of the first compartment 24, with an aisle (A) that runs between the support racks 42a from an outside door E to the inside door 28b. The station 20 therefore provides twenty hoses 40 in the illustrated arrangement, with ten hoses 40 provided on each side of the station 20. As will be appreciated, fewer or additional reels and hoses may be used in alternative examples.

As shown in a representative example in FIG. 4, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first section 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40a and each integrated fuel cap sensor 50 may have a corresponding mating connector to facilitate rapid connection and disconnection of the hose 40 with the integrated fuel cap sensor 50. For example, the connector end 40a and mating connector on the integrated fuel cap sensor 50 form a hydraulic quick-connect.

At least the control valves 44, pump or pumps 30, sensor or sensors 36b, and register 34 are in communication with a controller 52 located in the second section 26. As an example, the controller 52 includes software, hardware, or both that is configured to carry out any of the functions described herein. In one further example, the controller 52 includes a programmable logic controller with a touchscreen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30.

The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here is a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

Figure 6A:
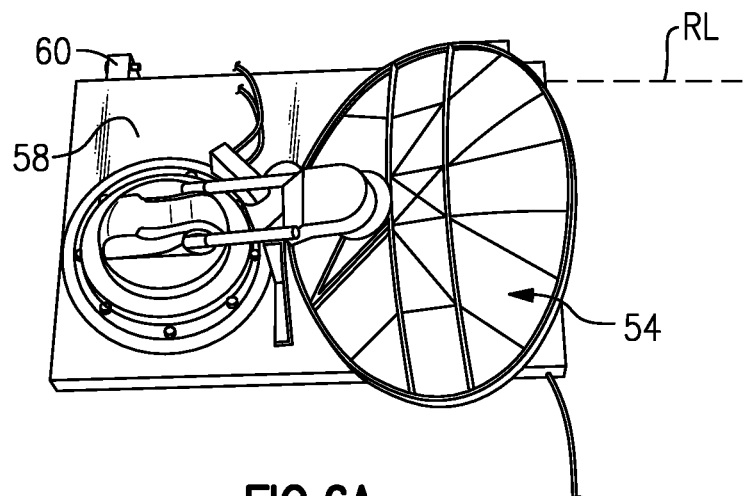
FIG. 6A illustrates the satellite dish in a stowed position.
Figure 6B:
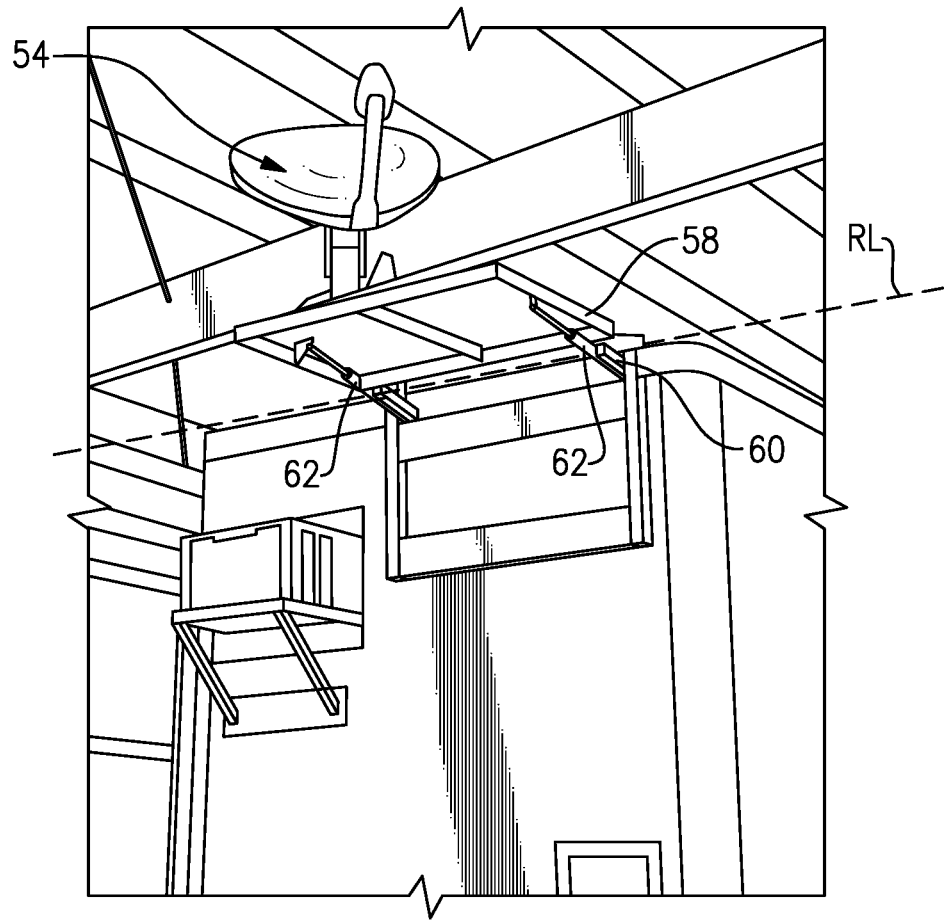
FIG. 6B illustrates the satellite dish in a deployed position.

As shown in FIG. 5, the distribution station 20 additionally includes a satellite dish 54 mounted on the mobile trailer 22. The satellite dish 54 is connected via line 56 for communication with the controller 52 and can be used to send and receive signals representative of operating parameters of the station 20. As shown in, respectively, FIGS. 6A and 6B, the satellite dish 54 is moveable between a stowed position and a deployed position. In the illustrated example, the satellite dish 54 is mounted in a platform 58 that is moveable in order to move between the stowed and deployed positions.

The platform 58 is of rigid construction to bear the weight of the satellite dish 54 and is mounted by one or more hinges 60 to the mobile trailer 22. In this example, the platform 58 is mounted at an edge E of the trailer 22, such as the upper rear edge. The platform 58 can pivot about the hinge or hinges 60 to thus permit the satellite dish 54 to be raised or lowered. In the example shown, this movement is performed by one or more electric actuators 62 (FIG. 6B), which can be activated from inside of the trailer 22 by an operator.

In the stowed position (FIG. 6A), the platform 58 is in its lowered position, folded down against the side of the mobile trailer 22. In the deployed position (FIG. 6B), the platform 58 is in its raised position in which it projects from the mobile trailer 22 as an overhang. Here, the satellite dish 54 can also be folded down toward the platform 58, as in the stowed position, or raised proud from the platform in the deployed position. That is, the stowed and deployed positions each have two sub-positions. In the stowed position the platform is in its lowered position and the satellite dish 54 is in its folded position, while in the deployed position the platform is raised and the satellite dish 54 is raised.

The stowed and deployed positions permit the satellite dish 54 to be raised when in use but lowered when not in use in order to protect the satellite dish 54 from damage. For instance, in the stowed position the satellite dish 54 sits close to the side of the trailer 22 and below a top roofline RL, where it is shielded from debris and low overhangs (e.g., bridges) during transit between work sites. However, once at the work site, the satellite dish 54 can then be moved to the deployed position for operation in which it can be in a clear line of view of the sky for satellite tracking.

Figure 7:
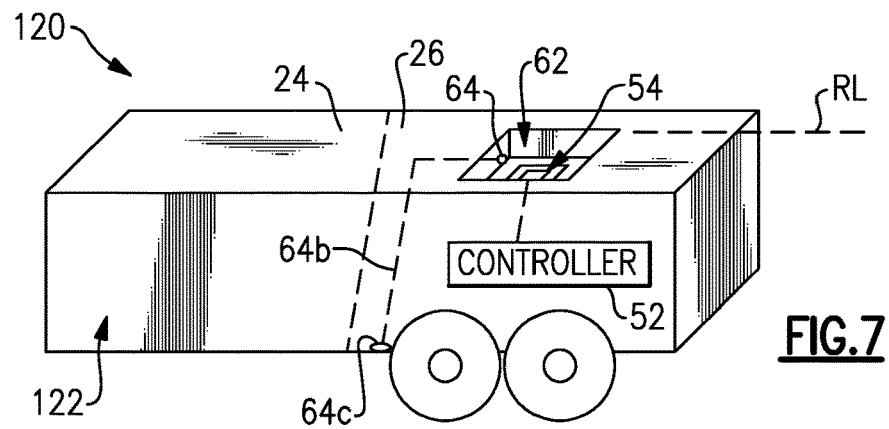
FIG. 7 illustrates another mobile distribution station with a satellite dish in a recessed compartment.

FIG. 7 illustrates another example of a mobile distribution station 120 that has a mobile trailer 122. In this disclosure, like reference numerals designate like elements where appropriate and reference numerals with the addition of one-hundred or multiples thereof designate modified elements that are understood to incorporate the same features and benefits of the corresponding elements. In this example, rather than having the platform 58, the satellite dish 54 is mounted in a compartment 62 that is recessed below the top roofline RL of the trailer 122. In this example, the compartment is over the second section 26 that contains the isolated control room.

Figure 8A:
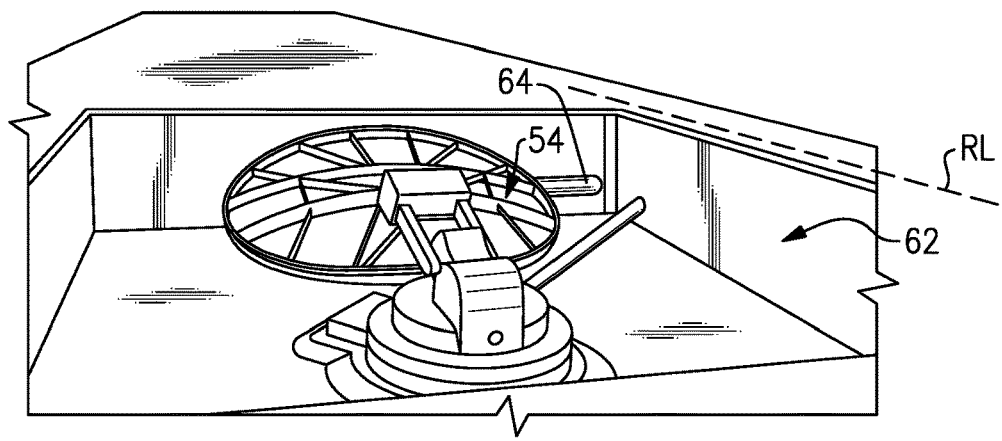
FIG. 8A illustrates the satellite dish of FIG. 7 in a stowed position.
Figure 8B:
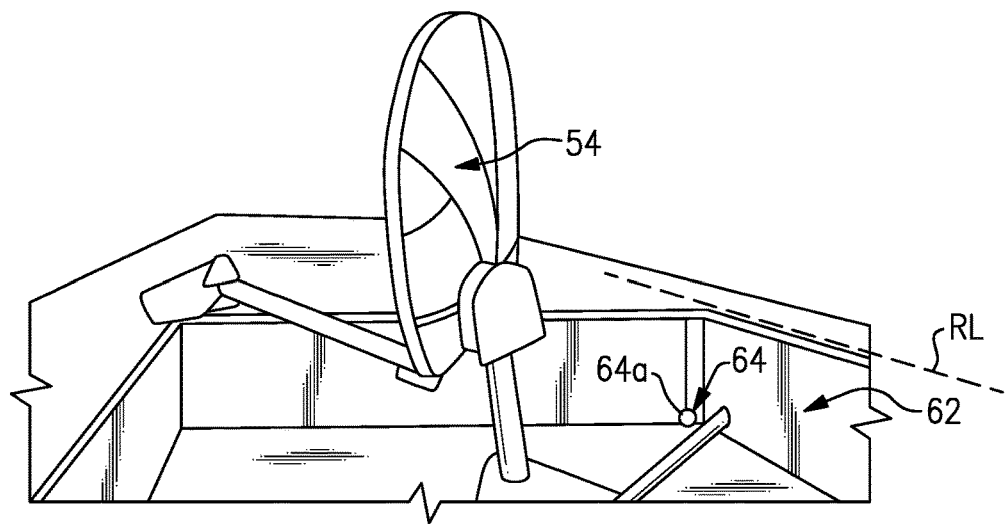
FIG. 8B illustrates the satellite dish of FIG. 7 in a deployed position.

For instance, the compartment 62 is an open-top compartments that has four sidewalls, a bottom wall, and an open top. When in the stowed position as shown in FIG. 8A, the satellite dish 54 is below the top roofline RL, while in the deployed position as shown in FIG. 8B the satellite dish 54 is above the top roofline RL.

Because of the open-top of the compartment 62, the compartment 62 may be prone to collecting water or snow. In this regard, the compartment 62 may include one or more drains 64. The drain 64 may include a hole 64*a* (FIGS. 8A and 8B) in the compartment wall and a drain line 64*b* (FIG. 7) that is routed through the trailer 122 to a drain outlet 64*c* near or at the bottom of the trailer 122 to expel the water to the ground. This permits the water to be drained from the compartment 62 so that it does not fill and damage the satellite dish 54.

Figure 9A:
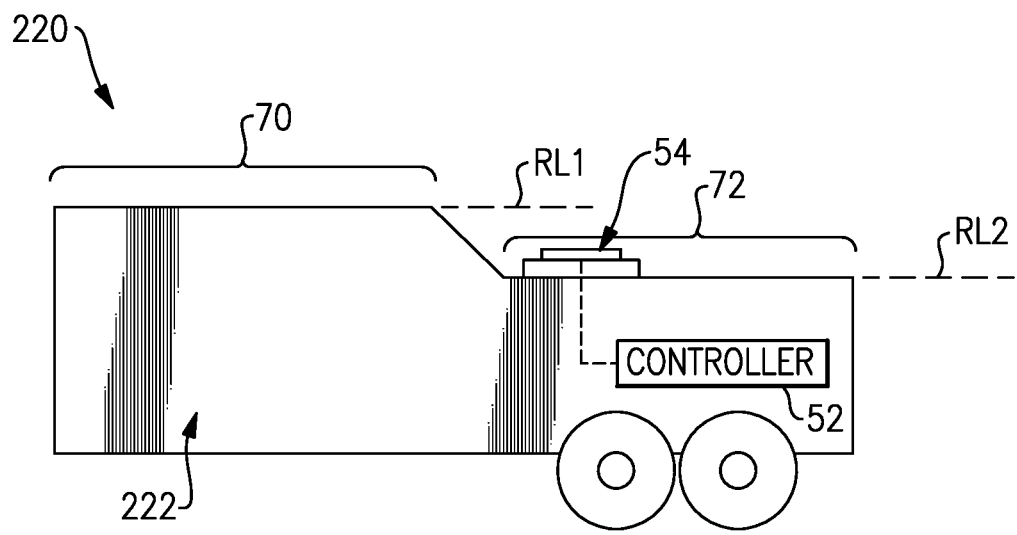
FIG. 9A illustrates a multi-tier mobile distribution station with a satellite dish in a stowed position.
Figure 9B:
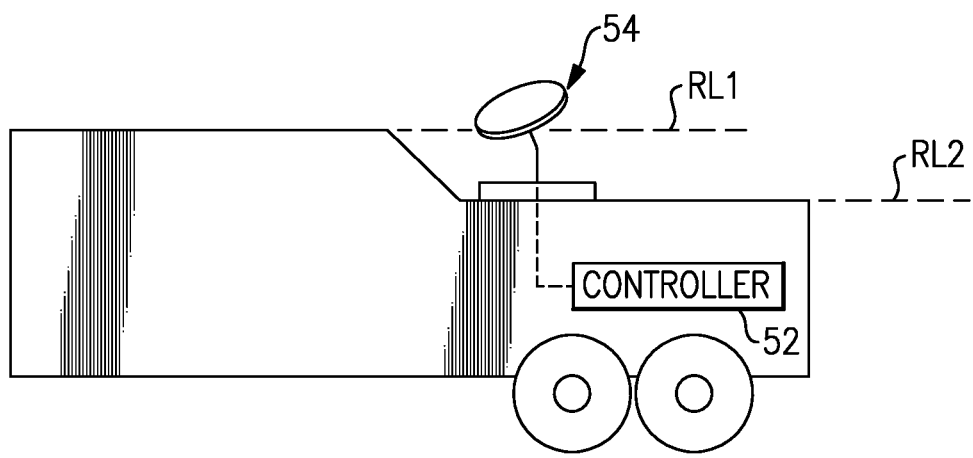
FIG. 9B illustrates the multi-tier mobile distribution station with the satellite dish in a deployed position.

FIG. 9A illustrates another example mobile distribution station 220 that has a mobile trailer 222. In this example, the mobile trailer 222 includes a multi-tier roofline that has a first, top roofline section 70 that has a first top roofline RL1 and a second, lower roofline section 72 that has a second low roofline RL2. The satellite dish 54 is mounted on the second roofline section 72. Unlike the compartment 62, the satellite dish 54 in this example is non-enclosed, and thus no drain may be needed. In the stowed position shown in FIG. 9A the satellite dish 54 is below the first roofline RL1 and in the deployed position shown in FIG. 9B the satellite dish 54 is above the first roofline RL1.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
a mobile trailer;
a pump on the mobile trailer;
at least one manifold on the mobile trailer and fluidly connected with the pump;
a plurality of reels on the mobile trailer;
a plurality of hoses, each said hose connected with a different one of the reels;
a plurality of valves on the mobile trailer, each said valve situated between the at least one manifold and a respective different one of the reels;
a plurality of fluid level sensors, each said fluid level sensor being associated with a different one of the hoses;
a controller configured to individually open and close the valves responsive to the fluid level sensors, the mobile trailer capable of being moved in transit between work sites and then immobilized and activated at the work sites to deliver fluid via the hoses; and
a satellite dish mounted on the mobile trailer, the satellite dish configured to be in a stowed position when the mobile trailer is in transit and in a deployed position when the mobile trailer is activated;
wherein the mobile trailer defines a top roofline, and in the stowed position the satellite dish is below the top roofline and in the deployed position the satellite dish is above the top roofline,
wherein the mobile trailer includes a compartment recessed below the top roofline, and the satellite dish is mounted in the compartment, and
wherein the mobile trailer includes an isolated control room, and the compartment is over the isolated control room.

2. The distribution station as recited in claim 1, wherein the compartment includes a water drain.

3. The distribution station as recited in claim 1, wherein the compartment includes four side walls, a bottom wall, and an open top, and wherein the satellite dish is mounted to the bottom wall.

4. The distribution station as recited in claim 1, the compartment is over the isolated control room such that a straight line extending normal to the top roofline passes through both the satellite dish and the isolated control room.

* * * * *